United States Patent
Chen et al.

(10) Patent No.: US 7,006,468 B1
(45) Date of Patent: Feb. 28, 2006

(54) PAGE MONITORING METHOD AND APPARATUS

(75) Inventors: Tao Chen, San Diego, CA (US); Jun Wang, San Diego, CA (US); Edward G. Tiedemann, Jr., San Diego, CA (US)

(73) Assignee: QUALCOMM, Incorporated, San Diego, CA (US)

(*) Notice: Subject to any disclaimer, the term of this patent is extended or adjusted under 35 U.S.C. 154(b) by 0 days.

(21) Appl. No.: 09/625,777

(22) Filed: Jul. 26, 2000

(51) Int. Cl.
*H04Q 7/00* (2006.01)

(52) U.S. Cl. ............... 370/330; 370/500; 370/479; 455/458; 455/502

(58) Field of Classification Search ............... 370/320, 370/332, 335, 342, 500, 479; 455/458, 502, 455/503, 65, 506; 375/267, 299, 347
See application file for complete search history.

(56) References Cited

U.S. PATENT DOCUMENTS

| | | | |
|---|---|---|---|
| 5,103,459 A | 4/1992 | Gilhousen et al. | |
| 5,261,118 A * | 11/1993 | Vanderspool et al. | 455/503 |
| 5,590,398 A * | 12/1996 | Matthews | 455/458 |
| 5,920,549 A | 7/1999 | Bruckert et al. | 370/331 |
| 6,018,667 A * | 1/2000 | Ghosh et al. | 455/502 |
| 6,111,865 A | 8/2000 | Butler et al. | |
| 6,138,034 A * | 10/2000 | Willey | 455/436 |
| 6,195,551 B1 * | 2/2001 | Kim et al. | 370/332 |
| 6,216,004 B1 * | 4/2001 | Tiedemann et al. | 370/331 |
| 6,393,295 B1 * | 5/2002 | Butler et al. | 455/458 |
| 2001/0043578 A1 * | 11/2001 | Kumar et al. | 370/331 |
| 2002/0006805 A1 * | 1/2002 | New et al. | 455/502 |

FOREIGN PATENT DOCUMENTS

| | | |
|---|---|---|
| WO | 9943180 | 8/1999 |
| WO | 0022747 | 4/2000 |

OTHER PUBLICATIONS

Soft Handoff on the Paging Channel in cdma2000, S. Sarkar, RAWCON 99. Aug. 1, 1999.*
The Paging Channel in cdma2000, S. Sarkar, ICON '99, Sep. 28, 1999.*

* cited by examiner

*Primary Examiner*—Brian Zimmerman
(74) *Attorney, Agent, or Firm*—Philip R. Wadsworth; Thien T. Nguyen; Kam T. Tam

(57) ABSTRACT

A wireless communication system is provided that includes a plurality of origination stations and at least one terminal. The plurality of origination stations each communicate a signal comprising a regular page message over respective regular paging channels and a quick paging channel page message over respective quick paging channels. The terminal, when in an idle state during which an RF receiver is off, simultaneously monitors each of the quick paging channels for their respective quick paging channel page messages.

2 Claims, 5 Drawing Sheets

PAGE MONITORING METHOD AND APPARATUS

BACKGROUND

I. Technical Field

The present invention relates to wireless communications. More particularly, the present invention relates to a novel and improved method and apparatus for monitoring page messages in spread spectrum communications.

II. Background

In U.S. patent application Ser. No. 08/316,177, file Sep. 30, 1994, now Abandoned entitled "Multipath Search Processor For A Spread Spectrum Multiple Access Communication System" (the '177 application), incorporated by reference herein and assigned to the assignee of the present invention, a searcher for detecting spread spectrum signals is described. The searcher is particularly suited for use in a CDMA based digital cellular telephone system to identify pilot channels transmitted within the CDMA system. Once the pilot channel is identified, the telephone, or "subscriber unit," uses the associated timing information to perform functions such as monitoring for page messages and conducting communications.

The searcher according to the '177 application typically works in combination with a set of finger elements and a decoder placed on a single integrated circuit. Together, the components perform the processing necessary for CDMA communications and page monitoring. For example, to receive a CDMA signal the searcher does pilot channel searching at various offsets in time. Once a pilot channel is detected, the finger elements are activated to process an associated data channel, such as a paging channel or a traffic channel. To perform the searching and the signal processing, the searcher and finger elements receive samples generated in response to RF signals received by the subscriber unit. The samples are typically generated by an RF/IF unit within the mobile phone or subscriber unit.

In general, it is desirable to reduce the power consumption of a subscriber unit to reduce the battery size and weight. Additionally, it is desirable to increase the reliability with which pages and other messages are received and processed by the subscriber unit.

SUMMARY OF PREFERRED EMBODIMENTS

A wireless communication system is provided that includes a plurality of terminals including a first terminal, a first origination station and a second origination station. The first terminal is in an idle state during which an RF receiver is off. The first origination station communicates a signal comprising first regular page message over a first regular paging channel and a first quick paging channel page message over a first quick paging channel. The second origination station that communicates a signal comprising second regular page message over a second regular paging channel and a second quick paging channel page message over a second quick paging channel. The first terminal can simultaneously monitor both the first quick paging channel for the first quick paging channel page message and the second quick paging channel for the second quick paging channel page message.

The terminal can activate the RF receiver at predetermined times during which the terminal can potentially receive a quick paging channel page message and records at least a segment of the signal. The terminal can process the signal to determine the existence of quick paging channel pages from the origination stations from which the signals are greater than or equal to a threshold. When the terminal determines that the existence of quick paging channel pages from both the origination stations and the signals are greater than or equal to a threshold, the terminal can choose the paging channel to monitor (1) from the origination station having the signal with the strongest signal-to-noise and interference ratio among all the origination stations for which a QCPH page was detected, (2) based on a pre-arranged priority order among the origination stations, or can monitor all of the paging channels for their regular page messages by recording the signals for a period during which an regular page would exist, and processing the signals to receive the possible page on different paging channels. The terminal can serially process the signals to receive the possible page on different paging channels, or alternatively, can process the signals in parallel to receive the possible page on different paging channels.

When the terminal determines the existence of quick paging channel pages from both the origination stations and the signals are greater than or equal to a threshold, the terminal can receive symbols from the regular paging channels in parallel and decode the pages from different originations station in parallel or serially.

The terminal preferably includes a rake receiver having a plurality of fingers, and when the terminal determines the existence of quick paging channel pages from both the origination stations and that the signals are greater than or equal to a threshold, the terminal can receive symbols from the regular paging channels in parallel and decode the pages from different origination stations in parallel or serially by combining only those symbols from fingers locked on paths from the same origination stations, and then decoding these symbols separately.

When the origination stations synchronize quick paging channel pages, the terminal may soft combine the quick paging channel pages from the origination stations to enhance detection.

When there is a delay between regular pages, once the RF receiver is activated, the terminal can detect the regular paging channels individually, and if the regular paging channels can not be received individually, the terminal can soft combine the regular paging channels. Soft combining of the regular paging channels can be done with multiple hypothesis based on the relative delay between the regular paging channels.

When the quick paging channel pages are not synchronized, the terminal can individually detects quick paging channel pages from each of the origination stations separately.

The first origination station can communicate the first quick paging channel carrying the quick paging channel page at a first position, and the second origination station can communicate over the second quick paging channel carrying the quick paging channel page at a second position. The first position and the second position can be the same and do not depend upon identity of the origination stations.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF SPECIFIC EMBODIMENTS

A novel and improved method and apparatus for detecting paging messages are described. The exemplary embodiment described herein is set forth in the context of a digital cellular telephone system. While use within this context is advantageous, different embodiments of the invention may be incorporated in different environments or configurations. In general, the various systems described herein may be formed using software-controlled processors, integrated circuits, or discrete logic. Implementation in an integrated circuit is advantageous. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Figure 1:
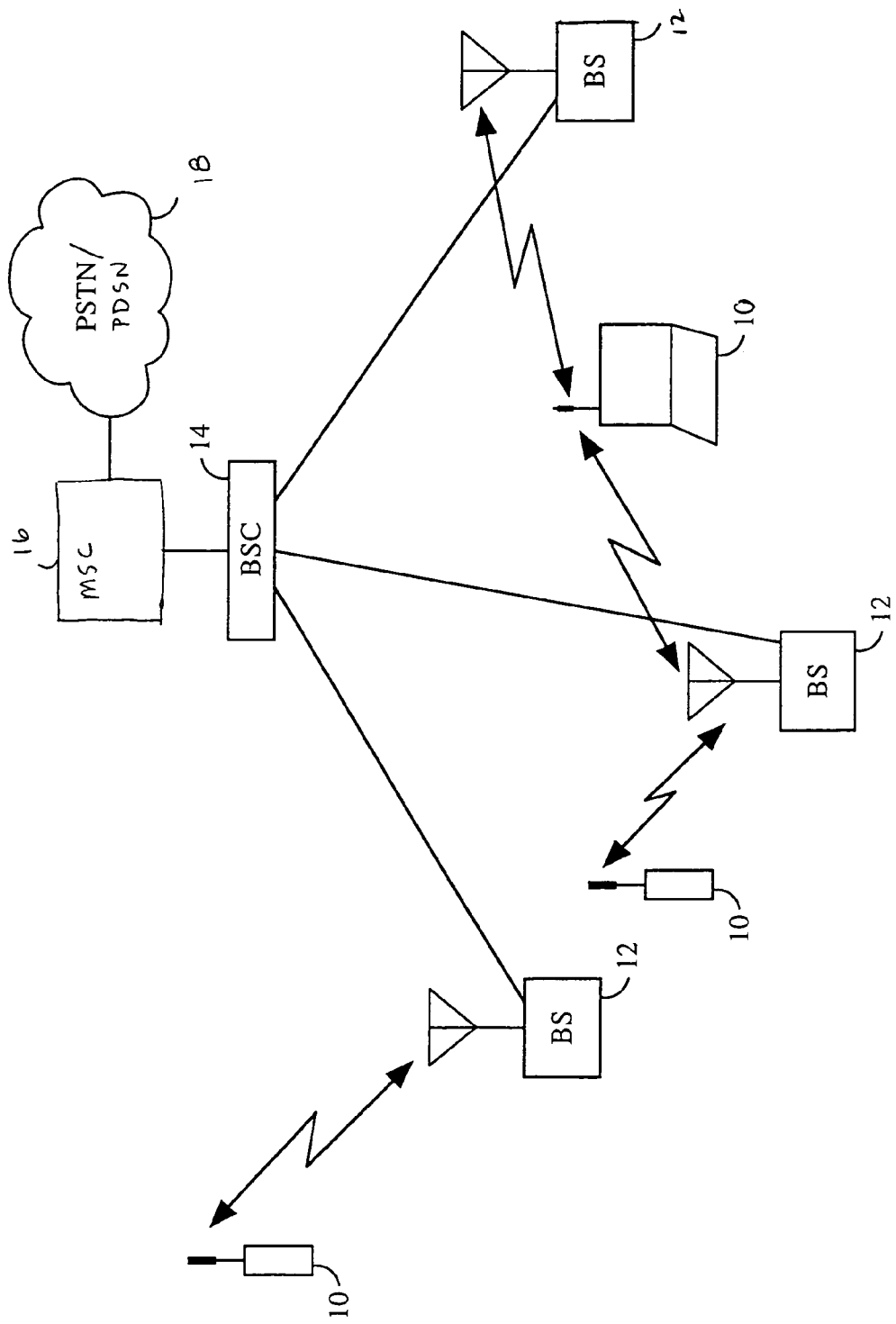
FIG. 1 depicts a cellular telephone system configured in accordance with an embodiment of the invention.

FIG. 1 is a block diagram of a cellular telephone system configured in accordance with one embodiment. Mobile telephones and other communication systems (subscriber units) 10 are located among base stations 12, which are coupled to a base station controller (BSC) 14. Mobile switching center (MSC) 16 connects BSC 14 to the public switch telephone network (PSTN)/public data system network (PDSN) 18. BSC 14 may be connected to other base station controllers (not shown for simplicity). Similarly, MSC 16 may be connected to other base station controllers and mobile station controllers (not shown for simplicity). During operation, some mobile telephones 10 conduct telephone calls by interfacing with base stations 12 while others are in an idle, or standby, mode in which they monitor for page messages.

In accordance with the use of some CDMA communications protocols, a subscriber unit 10 can simultaneously interface with two base stations 12 in soft handoff. A system and method for operating a cellular telephone using CDMA techniques is described in U.S. Pat. No. 5,103,459 entitled "System and Method for Generating Signal Waveforms in a CDMA Cellular Telephone System", (the '459 patent), assigned to the assignee of the present invention and incorporated by reference herein. The system of the '459 patent is configured substantially in accordance with the use of the IS-95 over-the-air interface standard.

Additionally, in one embodiment of the invention, paging of a subscriber unit 10 is performed substantially in accordance with the paging method described in U.S. Pat. Nos. 6,111,865 and 6,393,295, both entitled "Dual Channel Slotted Paging," (the dual channel paging applications), assigned to the assignee of the present invention and incorporated by reference herein, and wherein the use of a quick paging message (quick page) transmitted over a reduced encoding channel is described. One or more quick pages are transmitted before the full page message (full page) to allow a subscriber unit to reduce page monitoring time, and therefore reduce standby power consumption. Generally, if the subscriber unit does not receive a positive quick page, then it does not monitor for the full page, thereby reducing idle mode power consumption.

Figure 2:
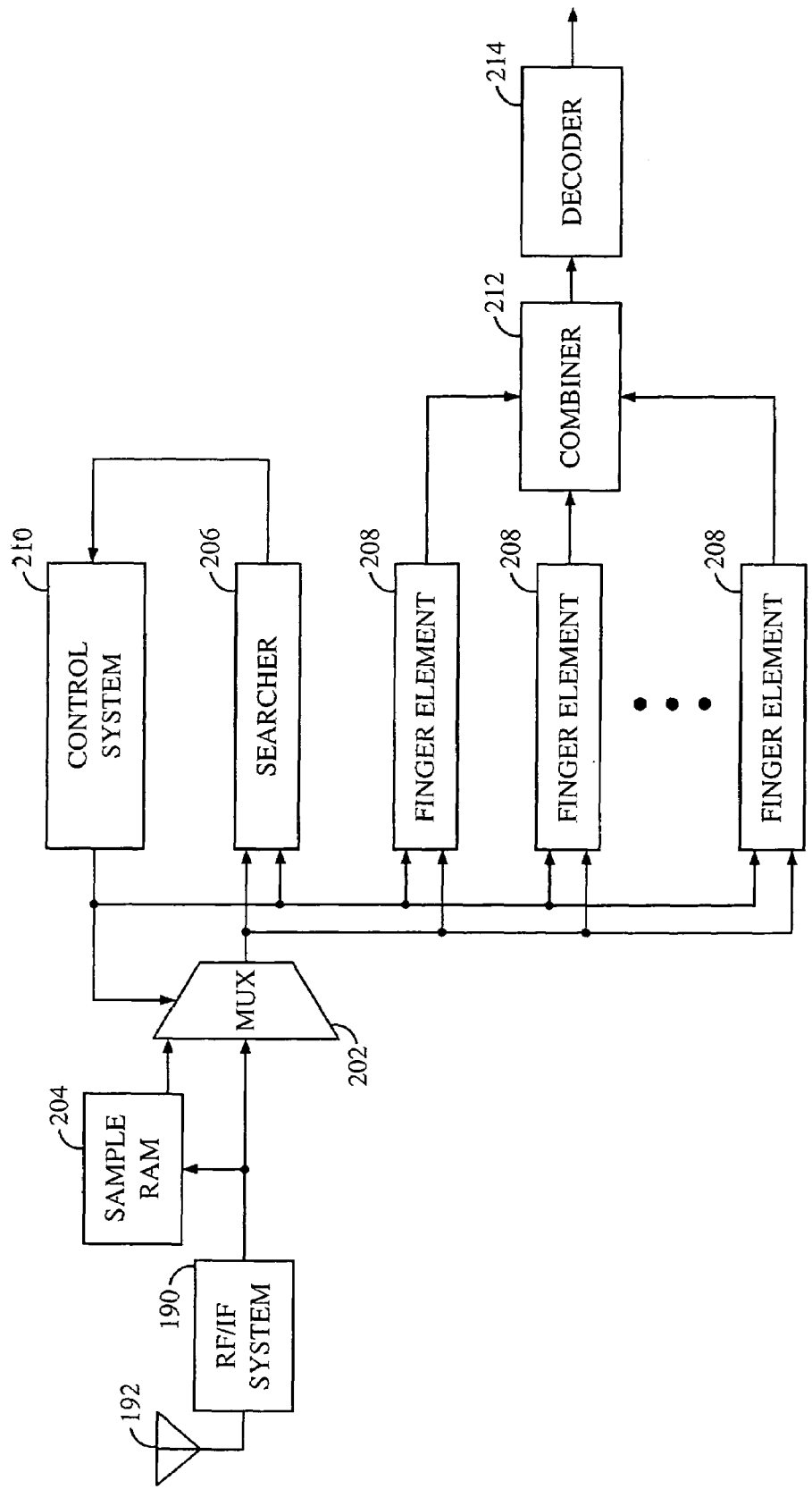
FIG. 2 depicts a block diagram of a receiver portion of a subscriber unit configured in accordance with an embodiment of the invention.

FIG. 2 is a block diagram of a demodulator used for processing CDMA signals in accordance with one embodiment of the invention. Receive (Rx) samples are generated by radio frequency/intermediate frequency (RF/IF) system 190 and antenna system 192, which receive RF signals, filter, downconvert, and digitize the RF signals to baseband. The samples are supplied to mux 202 and sample RAM 204. The output of mux 202 is supplied to searcher unit 206 and finger elements 208, which are coupled to control unit 210. Combiner 212 couples decoder 214 to finger elements 208. Typically, control unit 210 is a microprocessor controlled by software, and may be located on the same integrated circuit or on a separate integrated circuit.

During operation, receive samples (samples) are stored in sample RAM 204 and applied to mux 202. Mux 202 supplies either real time samples or the stored sample to searcher unit 206 and finger elements 208. Control unit 210 configures finger elements 208 to perform demodulation at different time offsets based on search results from searcher unit 206. The results of the demodulation are combined in combiner 212 and passed to decoder 214, which outputs the data.

In general, the searching performed by searcher 206 uses non-coherent demodulation of the pilot channel to test timing hypotheses corresponding to various sectors, base stations and multi-paths, while the demodulation performed by finger elements 208 is performed via coherent demodulation of the data channel. Non-coherent demodulation does not require carrier phase information, but detects signal energy rather than the data contained in the signal (for certain waveform types). Throughout this application, the term demodulation alone refers to coherent demodulation, while searching refers to non-coherent demodulation. In one embodiment of the invention, despreading is performed by multiplying the received samples with the complex conjugate of the PN sequence and assigned Walsh function at a single timing hypothesis and digitally filtering the resulting samples, often with an integrate and dump accumulator circuit.

The demodulation and searching can be performed at various time offsets, and the results of the demodulation are combined to determine if a page message was received. Advantageously, the page channel demodulated by searcher is similar to the quick paging channel described in the dual channel paging applications referenced above. As the message duration is small for quick paging (128 or 256 PN chips at 1.2288 Mega chip per second (Mcps) is 104 or 208 microseconds) and the necessary de-skew is small, (about 100–400 microseconds) the required received samples can be readily buffered and processed "off-line" to save power.

Figure 3:
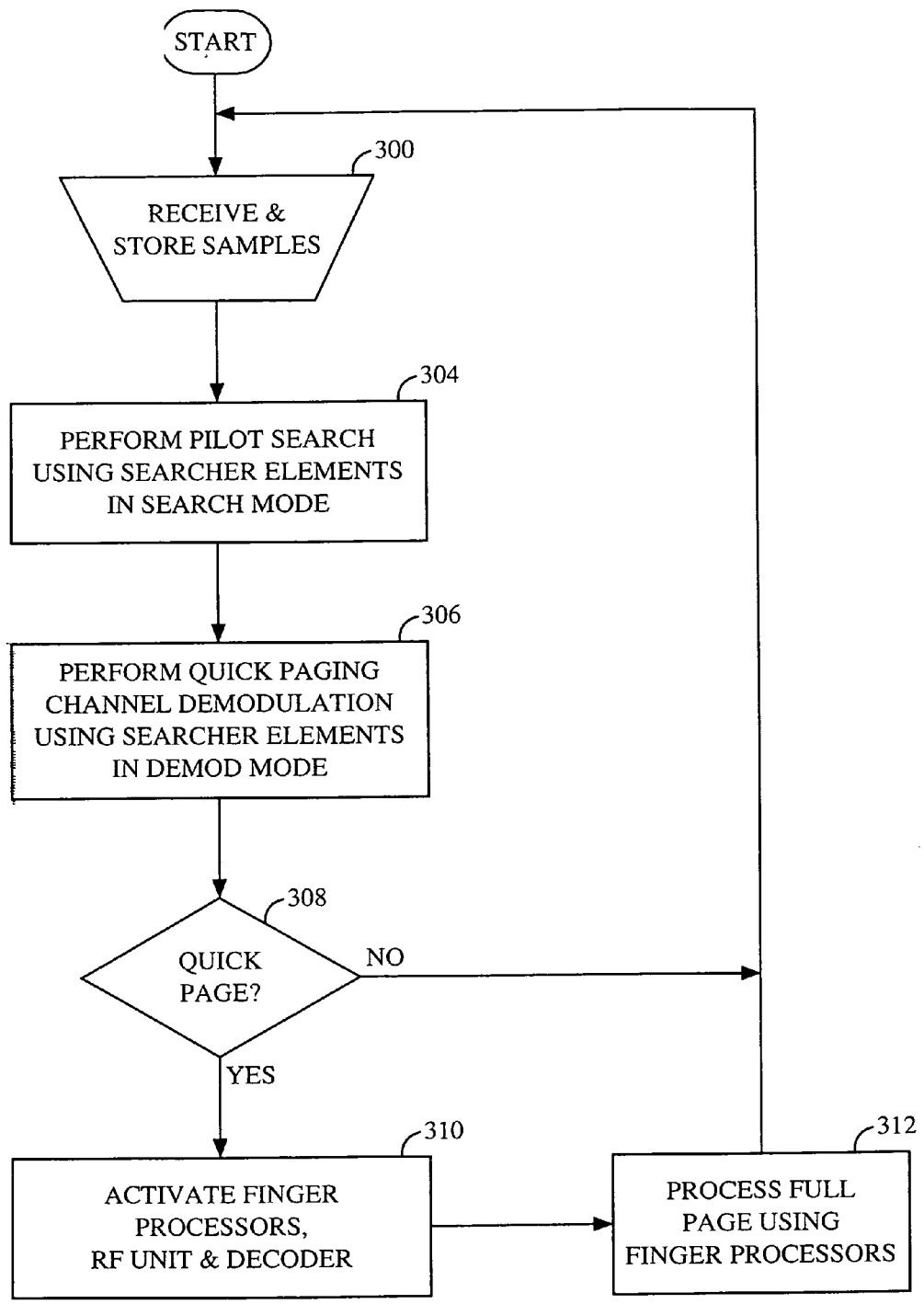
FIG. 3 depicts a flow chart illustrating the processing steps performed within a subscriber unit when performed in accordance with an embodiment of the invention.

FIG. 3 is a flow chart illustrating the operation of the demodulator of FIG. 2 during idle mode in accordance with an embodiment of the invention. Idle mode is the state in which the subscriber unit is powered up but not making a call. During idle mode the subscriber unit monitors for paging messages directed to it. The paging message may indicate an incoming communication or telephone call.

At step 300, the subscriber unit collects and stores received samples during the quick paging slot assigned to it. In one embodiment, the collection is performed by activating the RF/IF system 190, storing the samples in the sample RAM, and then deactivating the RF/IF system 190. Typically the subscriber unit collects samples for a longer duration than that of a single quick paging slot so that multiple time offset signals are stored within the set of received samples. In another embodiment, the samples pass to searcher unit 206 in real time without being stored.

At step 304 searcher unit 206 (of FIG. 2) performs pilot searching on the samples at various time offsets. Additionally, pilot searching may be performed for different signals. For example, searching may be performed for signals from different base stations that use different, or differently offset, pilot codes. When a local maxima is detected above a certain threshold, and the combine function is enabled for the particular search window, the resulting hypothesis is demodulated and combined. Once all the hypotheses in a search list have been completed, the step is done.

In one embodiment of the invention, it is advantageous to have samples large enough to cover the time offset of a set of multipath signals. Thus, by simply searching the same set of samples at different offsets, different pilots may be detected. Similarly, the same set of samples may be demodulated at different offsets to process quick pages. While a quick page channel designed for coherent signaling provides better performance, and therefore is advantageous in many instances, a quick paging system may be designed for non-coherent signaling as well.

At step 306, searcher 206 is switched to demodulation mode, and the paging channel associated with each signal detected during search mode is demodulated to determine if a quick page has been received. The quick pages are processed by performing coherent demodulation on the set of paging channels corresponding to the set of pilot channels detected during searching. Thus, in one embodiment of the invention, the quick page channel is demodulated within the searcher after the searching is performed. Each demodulation is performed at a particular offset within the samples, and the resulting set of demodulation soft decision data is diversity combined using an accumulator within searcher 206.

At step 308 the combined demodulation data is examined to determine if a positive quick page has been received (i.e., one indicating that the following full paging message may be directed to the particular subscriber unit). If a positive quick page has not been received, the subscriber unit returns to step 300. If a positive quick page has been received, the finger elements 208, decoder 214 and RF/IF unit 190 are activated at step 310, and the full page processed at step 312. In an alternative embodiment of the invention, the subscriber unit continues to search the samples for other pilots to find new signals to process when the next paging slot occurs. Additionally, if the quick paging channel was not received with sufficient quality, then step 310 is performed anyway to ensure that a full-page message is not missed.

By performing both the searching and quick page processing within searcher unit 206, the quick paging channel can be monitored without having to activate finger elements until a positive quick page is received. Generally, most quick page messages will be negative, indicating that no call or message is pending. Thus, the time the finger elements 208 and other circuitry are activated is significantly reduced. Therefore, reducing the circuitry used to perform quick page channel monitoring increases the standby time of the subscriber unit.

This reduction in circuitry is accomplished by taking advantage of the reduced coding level of the quick paging channel and quick page message and storing received samples for processing. The reduced coding allows the demodulation of the quick paging channel to be performed with a limited amount of demodulation functionality, and therefore with limited additional complexity in the searcher. Also, the use of sample RAM 204 allows multiple time offset demodulation to be performed using a single demodulation engine within searcher 206, which further reduces the circuitry necessary to monitor for paging messages.

Additional power savings are realized by performing the search and page channel monitoring using stored samples. In one embodiment, the quick paging channel is an uncoded binary phase shift keying (BPSK) or on-off-keying (OOK) bit sent once or twice. In particular, the time that the RF/IF unit 190 operates during each page cycle is reduced by storing the samples when they are generated. Once the samples are stored, the subscriber unit deactivates the RF/IF unit 190 to conserve power, and searches the samples repeatedly at different offsets or different pilot signals, or both, using only the digital circuitry.

As noted above, performing different searches on the same samples allows the RF unit to turn off once the initial set of samples is gathered. Turning off the RF unit reduces the power consumption of the mobile during idle mode. In contrast, if the samples were not stored, additional samples would have to be gathered for as long as it was necessary to search for the various pilot signals and time offsets. This continuous gathering of pilot data would require the RF unit to remain on, and therefore consuming power, for a longer period of time, which would reduce the stand-by time of the subscriber unit.

The described embodiments of the invention provide performance enhancements as well as improved idle mode power consumption. In particular, by performing demodulation and searching on the same set of samples, the performance of the demodulation is improved. This is because the best signals as measured by the pilot channel searching will be the best signals for paging channel demodulation because the set of samples are the same. In alternative systems, searching is performed on a first set of samples and the results of that searching are used to determine how to demodulate paging channels in a second set of samples. While the correspondence between the searching results and paging channel quality is typically reasonable if the time span between the two events is small, any difference in the channel between the search and demodulation is virtually eliminated when compared to fading channel decorrelation time by conducting searching and demodulation on the same samples.

Figure 4:
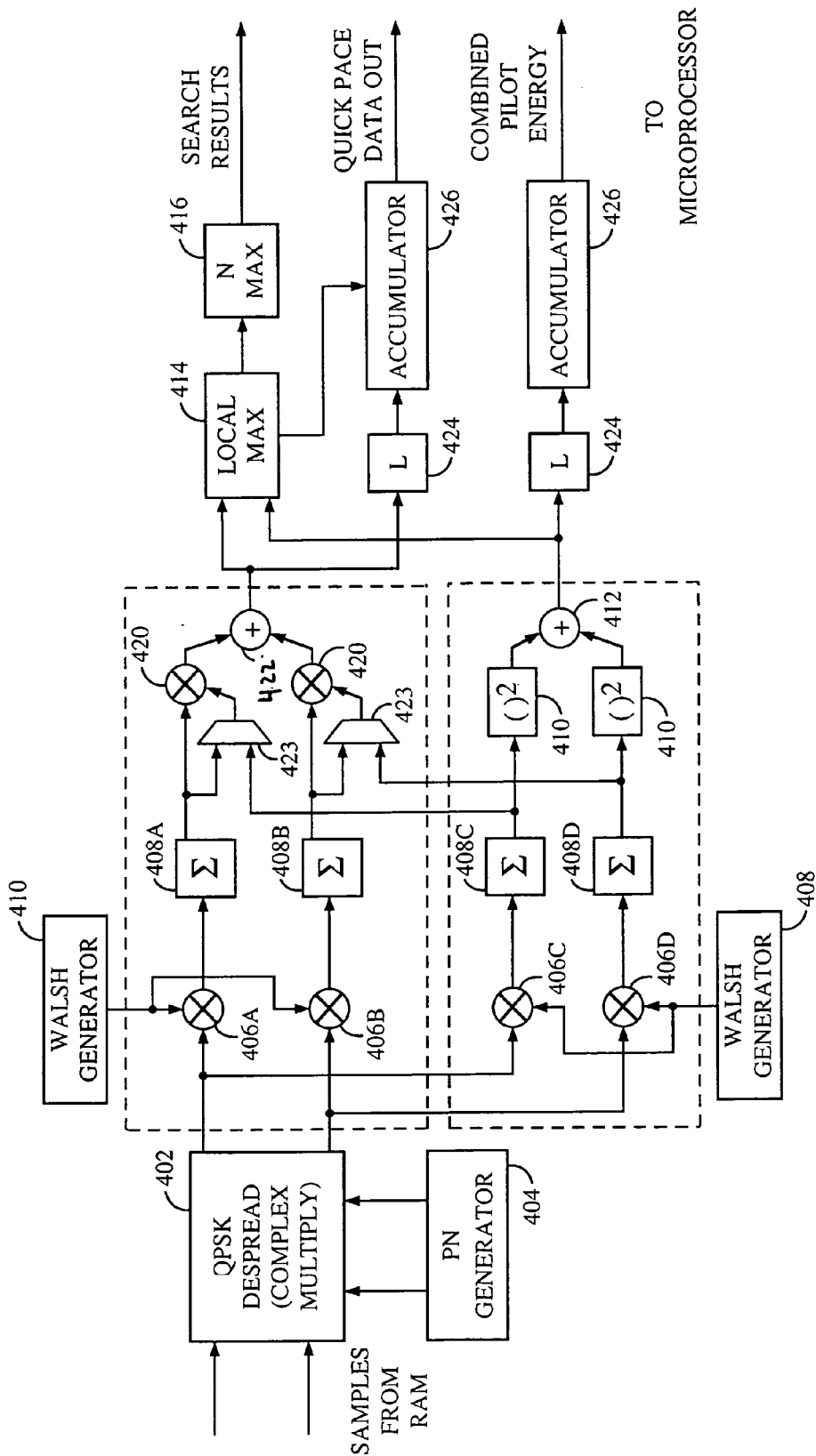
FIG. 4 depicts a block diagram of a searcher when configured in accordance with an embodiment of the invention.

FIG. 4 is a block diagram of searcher 206 when configured in accordance with one embodiment of the invention. The in-phase and quadrature phase samples are read from sample RAM 204 (FIG. 2) and despread by quadrature phase shift keying (QPSK) despreader 402 using a pseudo random noise (PN) code from PN code generator 404, where the PN code comprises an in-phase portion (PNI) and a quadrature phase portion (PNQ). The resulting in-phase and quadrature phase components from QPSK despreader 402 are applied to multipliers 406a–406d. Processing after the sample RAM 204 may happen at arbitrary clock frequencies, such as 19 MHz, that are unrelated to the original chip rate.

During search mode, Walsh code generators 408 and 410 generate the pilot channel Walsh code, which is applied to multipliers 406a–406d. Multipliers 406a–406d and accumulators 408a–408d operate together to de-cover the de-spread samples with the pilot Walsh code from Pilot Walsh code generators 408 and 410.

The decovered pilot samples from accumulators 408a and 408b are applied to multipliers 420 twice: once directly and once via multiplexers 423. By applying the decovered pilot samples twice, the result is that the decovered pilot samples are squared. The squared outputs are summed by a summer 422. Thus, in search mode, the dot product of the decovered pilot data is calculated, and therefore the correlation energy of the pilot channel at the current offset is calculated.

Similarly, the decovered pilot samples from accumulators 408c and 408d are applied to square circuits 410. The outputs of square circuits 410 are summed by a summer 412. Thus, the operations by square circuits 410 and summer 412 act to calculate the dot product of the decovered pilot data with itself, and therefore the correlation energy of the pilot channel at the current offset.

The dot products from summers 412 and 422 are received by a local maxima calculator 414. Local maxima calculator 414 determines the most likely offset, or offsets, from a set of offsets (or hypothesis) attempted by the searcher based on the correlation energy. For example, local max calculator 414 may save the local largest energy in a set of oversampled correlation energies in order to isolate the sample nearest to the true offset. Multipliers 406a and 406b and accumulators 408a and 408b operate together to decover the despread samples with the quick paging Walsh code from quick page Walsh code generator.

The set of offsets is generated as the timing of the PN and Walsh codes are adjusted relative to the samples. In an exemplary search, the PN and Walsh codes are adjusted in small increments around particular search regions. Typically, the code generators are configured by a control system which also defines the search regions with a start offset and a finish offset. The control system may be a microprocessor or digital signal processor controlled by software stored in memory.

N-max tracker 416 collects the set of N largest correlation energies for the different search regions. N is an integer, advantageously in the range of 4 to 16. The use of other criteria for collecting search results, such as diversity of signal source, is consistent with the use of the invention. The resulting set of correlation energies and associated offsets (search results) is reported to the control system.

In the exemplary embodiment of the invention, once the search operation has been performed, the control system configures the searcher to perform demodulation on the paging channel for a set of signals and offsets based on the search results. To perform demodulation of the page channel (advantageously the quick page channel), Walsh generator 410 is configured to generate the paging channel Walsh code, and multiplexers 423 are configured to apply the output of accumulators 408c and 408d to multipliers 420. Additionally, accumulators 408a and 408b are configured to integrate exactly over the bit duration.

For each signal to be demodulated, the control system configures the PN generator and Walsh generators at the particular offset, and the samples are demodulated again. The quick paging channel decovered samples from accumulators 408a and 408b are applied to multipliers 420. Additionally, the pilot channel decovered samples are applied to multipliers 420 via muxes 423.

To perform the dot product of pilot and paging data, the outputs of multipliers 420 are added by adder 422, and the resulting projected quick paging channel soft decision data is received by latches 424. Various other methods for adjusting for carrier phase will be apparent including the use of a cross product operation or other phase rotation methods. The dot product recovers the data that is in-phase with the pilots. Additionally, this data is weighted for combining. The output of latches 424 is then received by combiner accumulator 426. For each signal demodulated, accumulator 426 adds in the demodulation results. Once the set of signals is demodulated, the combined quick page data is output to the control system, which estimates the data transmitted by making a hard decision based on the accumulated soft decision data. Based on the hard decision, it is determined whether a quick page has been sent.

Additionally, in one embodiment of the invention, the energy from the decovered pilot channel data is calculated again by performing a dot product operation, and the resulting pilot energy is accumulated for each signal by accumulator 426. The accumulated pilot energy is forwarded to the control system.

In one embodiment of the invention, the control system determines whether to rely on the quick paging data based on the accumulated pilot energy. If the accumulated pilot energy is above a certain threshold, then the quick paging channel results are relied on. Otherwise, the next quick page slot is processed, or the full paging channel is processed. As noted above, using the same samples being used for the processing of the pilot and paging channels ensures that the channel is the same for the two processings, which improves demodulation performance.

The mobile station may receive pilot signals from several base stations at the same time. One of the base stations with the strongest Ec/Io may be monitored by the mobile station. When a quick page message on a quick paging channel (QPCH) is targeted for a mobile station, the quick page may be transmitted via several base stations. Multiple transmissions of the quick page are performed to assure that the mobile station receives at least one of the messages. The mobile station may be monitoring the base station with the strongest pilot Ec/Io, and if the quick page message is at least transmitted via the strongest base station, the mobile station detects the quick page message. The actual page message is followed at some time later than the transmission time of the quick page. The mobile station may be moving in the coverage area or the channel condition changing at a rate such that when the actual page message is arrived, the originally identified best base station is no longer the best base station. As a result, the mobile station may fail to detect the actual page message.

Figure 5:
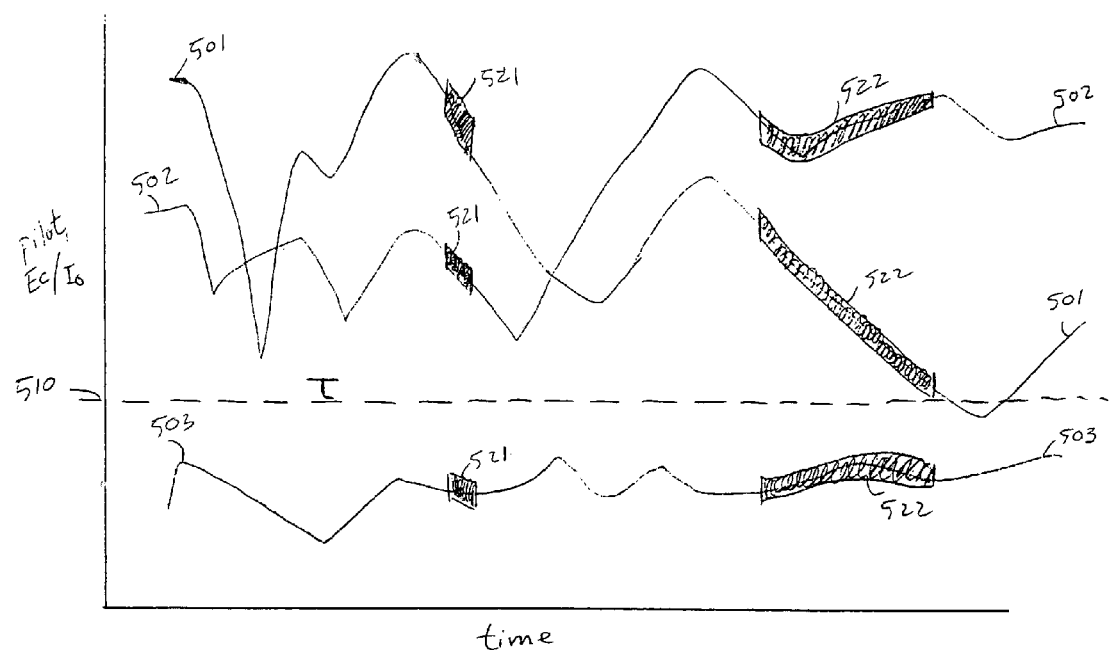
FIG. 5 depicts an example of a pilot signal Ec/Io fluctuation between transmissions of quick paging channels and paging channels.

In order to improve efficiency of detecting a page message, according to an embodiment of the invention, the mobile station keeps track of several base stations as the best base stations. Referring to FIG. 5, pilot signal Ec/Io over time as received by a mobile station is shown. The signals 501-03 are respectively from three different base stations. More base stations could be used. However, for simplicity only three are shown. Each base station transmits a QPCH message 521 to be received by a target mobile station. Note that, at the time of QPCH message 521, the pilot Ec/Io of signal 501 is higher than other pilot Ec/Io levels. Thus, the base station associated with the pilot signal 501 is considered the best base station. The QPCH message 521 basically contains information that a paging message 522 is going to follow for the mobile station. The paging message 522 is followed at a determined time following the QPCH message timing.

In a synchronized system, QPCH message 521 may be transmitted by different base stations at substantially the same time. Considering the propagation delay and other factors, QPCH message 521 may also be received at the mobile station substantially at the same time. As a result, the paging message 522 following QCPH message 521 is also transmitted from different base stations at substantially the same time, and received at substantially the same time. Note that, at the time of paging message 522, the base station associated with the pilot signal 501 may not be the best base station. If the mobile station limits the paging message detection to only the best base station as detected during the QPCH 521, the mobile station may fail to properly decode the paging message.

In order to solve the problem associated with the changes in the channel between the transmission time of the QPCH message 521 and the paging message 522, the mobile station tracks more than one base station as the best base station. The mobile station decides whether the Ec/Io of the pilot signal of different base stations during the QPCH message exceeds a threshold 510. Such a decision may be performed by control system 210 in connection with the operations performed by searcher 206 and finger elements 208 as described. If the Ec/Io exceeds threshold 510, the mobile station monitors the paging message 522 transmitted from all the base stations that exceeded the threshold.

Monitoring multiple paging messages at the same time may be accomplished by several ways. One way is to assign at least a finger to signals arriving from each base station. If there is more than one signal path from a base station, more than one finger may be assigned to each base station. The results of the assigned fingers to a base station are summed in the form of the data symbol energy. In order to sum the signal energies from different base stations, the results may need to be time aligned by time skewing the signal energies. The summed signal energies are applied to a decoder for decoding the paging message 522. The combined and de-skewed results of fingers assigned to a base station may pass through a de-interleaving process if the signal at the transmitting base station has been passed through an interleaving process. Interleaving and de-interleaving processes are known in the relevant art. The results of de-interleaving processes associated with signals from each base station pass through a decoding process for decoding the paging message 522. In a limited way, the signals from different base stations may be sampled and stored for a serial combining and decoding process.

In an alternative embodiment, the mobile station may keep track of several base stations as the best base stations for detecting paging message 522 independent of the QPCH messaging. The best base stations in the alternative embodiment may be pre-selected. The pre-selection may be based on criteria other than QPCH message reception or the pilot signal being above the threshold 510. For example, the mobile station may remain in approximately the same geographical areas in a low mobility situation. Therefore, the number of base stations surrounding the mobile station may remain constant. In this situation, the mobile station may wake up periodically based on an internal timing control to monitor the paging channel. If there is a paging message, the mobile station monitors the signals from all the pre-identified base stations.

The mobile station may wake up slightly ahead of time to search for pilot channels associated with the base stations that possibly carry a paging a message for the mobile station. The wake up time may be long after the QPCH timing but before the paging channel timing.

The mobile station may attempt to receive and decode paging channels transmitted from several base stations even though only one QPCH may have been detected during the QPCH timing. In such a situation, the mobile station, after detecting a QPCH from a base station, knows that most likely several base stations in the vicinity may send the page message. As such, the mobile station may limit its search during the QPCH channel to detection of only one QPCH. However, the mobile station advantageously continues to monitor several base stations for the actual page message. To select candidate base stations for detection of the paging message after detection of only one QPCH, the mobile station may wake up just before the paging channel timing as determined based on the detected QPCH timing for detecting pilot channels of the candidate base stations.

Thus, a system and method for performing page monitoring have been described. The previous description of specific embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A wireless communication system, comprising:
    a plurality of terminals including a first terminal in an idle state during which an RF receiver is off;
    a first origination station that communicates a signal comprising first regular page message over a first regular paging channel and a first quick paging channel page message over a first quick paging channel; and
    a second origination station that communicates a signal comprising second regular page message over a second regular paging channel and a second quick paging channel page message over a second quick paging channel, wherein the first and second origination stations synchronize first and second quick paging channel pages and there is a delay between regular pages;
    wherein the first terminal processes the signal to determine the existence of quick paging channel pages from the origination stations from which the signals are greater than or equal to a threshold, and simultaneously monitors both the first quick paging channel for the first quick paging channel page message and the second quick paging channel for the second quick paging channel page message, and soft combines the quick paging channel messages from the first and second origination stations to enhance detection, and
    once the RF receiver is activated, the terminal detects the regular paging channels individually, and if the regular paging channels can not be received individually, the terminal soft combines the regular paging channels with multiple hypothesis based on the relative delay between the regular paging channels.

2. A wireless communication system, comprising:
    a plurality of origination stations that each communicate a regular page message over respective regular paging channels and a quick paging channel page message over respective quick paging channels, wherein the origination stations synchronize quick paging channel messages and there is a delay between regular pages; and
    a terminal that, when in an idle state during which an RF receiver is off, simultaneously monitors each of the quick paging channels for their respective quick paging channel page messages, by activating the RF receiver at predetermined times during which the terminal can potentially receive a quick paging channel page message and records at least a segment of the signal from the origination station, and processing the signal to determine the existence of quick paging channel pages from the origination stations from which the signals are greater than or equal to a threshold;

wherein the terminal soft combines the quick paging channel pages from the origination stations to enhance detection, and once the RF receiver is activated, the terminal detects the regular paging channels individually, and if the regular paging channels can not be received individually, the terminal soft combines the regular paging channels with multiple hypothesis based on the relative delay between the regular paging channels.

* * * * *